(12) United States Patent
Inomata et al.

(10) Patent No.: US 7,954,588 B2
(45) Date of Patent: Jun. 7, 2011

(54) HOOD POP-UP SYSTEM AND HOOD POP-UP METHOD FOR A VEHICLE

(75) Inventors: Yusuke Inomata, Ebina (JP); Mitsuo Ehama, Kanagawa-ken (JP); Nobuhiro Iwai, Atsugi (JP); Yuusuke Tsushima, Ebina (JP); Toshihiro Yoshitake, Atsugi (JP); Kazuo Hoshino, Isehara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 12/208,131

(22) Filed: Sep. 10, 2008

(65) Prior Publication Data

US 2009/0072587 A1    Mar. 19, 2009

(30) Foreign Application Priority Data

Sep. 14, 2007    (JP) .................................. 2007-239638

(51) Int. Cl.
*B60K 28/10*    (2006.01)
(52) U.S. Cl. ...................................................... 180/274
(58) Field of Classification Search .................. 180/271, 180/274, 69.21; 296/187.04; *B60R 21/34*
See application file for complete search history.

(56) References Cited

U.S. PATENT DOCUMENTS

| 6,217,108 | B1 * | 4/2001 | Sasaki ....................... 296/187.09 |
| 6,439,330 | B1 * | 8/2002 | Paye ............................ 180/69.21 |
| 6,474,679 | B2 * | 11/2002 | Miyasaka et al. ........... 280/730.1 |
| 6,755,268 | B1 * | 6/2004 | Polz et al. .................... 180/69.21 |
| 7,303,040 | B2 * | 12/2007 | Green et al. ................... 180/274 |
| 7,380,625 | B2 * | 6/2008 | Wang ............................ 180/69.21 |
| 7,410,027 | B2 * | 8/2008 | Howard ......................... 180/274 |
| 7,413,049 | B2 * | 8/2008 | Schramm et al. .............. 180/274 |
| 7,520,363 | B2 * | 4/2009 | Yamaguchi et al. ........... 180/274 |
| 2007/0267892 | A1 * | 11/2007 | Scheuch et al. ........... 296/187.04 |

FOREIGN PATENT DOCUMENTS

| CN | 1836938 A | 9/2006 |
| DE | 100 33 186 A1 | 2/2001 |
| DE | 10 2005 008 633 A1 | 8/2006 |
| EP | 1 705 382 A1 | 9/2006 |
| JP | 11263191 A * | 9/1999 |
| JP | 3674296 B2 | 5/2005 |
| JP | 2006044652 A * | 2/2006 |

\* cited by examiner

*Primary Examiner* — Faye M. Fleming
(74) *Attorney, Agent, or Firm* — Foley & Lardner LLP

(57) ABSTRACT

A hood pop-up system for a vehicle that pops up a hood of the vehicle when a collision of the vehicle takes place, which includes: a hood pop-up unit which pops up the hood positioned at a closed position and supports the popped-up hood at a hood support position that is higher than the closed position; and a hood pop-up restricting unit which restricts upward movement of the popped-up hood at an uppermost pop-up position that is higher than the hood support position.

6 Claims, 5 Drawing Sheets

HOOD POP-UP SYSTEM AND HOOD POP-UP METHOD FOR A VEHICLE

BACKGROUND OF THE INVENTION

1. Field of the Invention

The present invention relates to a hood pop-up system and a hood pop-up method for a vehicle.

2. Description of the Related Art

Japanese Patent No. 3674296 discloses a hood pop-up system for a vehicle, which raises (pops up) the rear-end portion of a hood provided in the front portion of the vehicle, when the vehicle collides with an obstacle. A certain clearance is secured between the popped-up hood and a structure installed in the engine compartment so that the impact produced by the collision of the obstacle with the top surface of the hood can be absorbed and cushioned.

SUMMARY OF THE INVENTION

The above-mentioned hood pop-up system includes a wire connected between the vehicle body and the rear end of the hood, and is adapted to generate a tension in the wire when the hood is popped up beyond a certain pop-up position.

In the hood pop-up system, the popped-up hood oscillates in its thickness direction due to the inertial force acting thereon. And the hood comes so close to the structure installed in the engine compartment that it is difficult to secure a certain predetermined clearance between the hood and the structure.

A possible solution to the above-mentioned problem is to have a large clearance between the hood and the structure, but too large a clearance requires a hood pop-up actuator to be made large and heavy accordingly. On the other hand, too small a clearance makes the collision of the obstacle with the top surface of the hood bring the hood into contact with the structure installed in the engine compartment before the hood absorbs the entire impact energy of the collision.

An object of the present invention, therefore, is to provide a hood pop-up system and a hood pop-up method for a vehicle that are capable of securing a sufficient clearance between the hood and the structure installed in the engine compartment.

An aspect of the present invention is a hood pop-up system for a vehicle that pops up a hood of the vehicle when a collision of the vehicle takes place, comprising: a hood pop-up unit which pops up the hood positioned at a closed position and supports the popped-up hood at a hood support position that is higher than the closed position; and a hood pop-up restricting unit which restricts upward movement of the popped-up hood at an uppermost pop-up position that is higher than the hood support position.

Another aspect of the present invention is a method of popping up a hood for a vehicle, comprising: popping up a hood when a collision of the vehicle takes place; making the popped-up hood reach an uppermost pop-up position; letting the popped-up hood fall downwards; and supporting the popped-up hood at a hood support position that is lower than the uppermost pop-up position.

BRIEF DESCRIPTION OF THE DRAWINGS

The invention will now be described with reference to the accompanying drawings wherein.

DESCRIPTION OF PREFERRED EMBODIMENT

Figure 1:
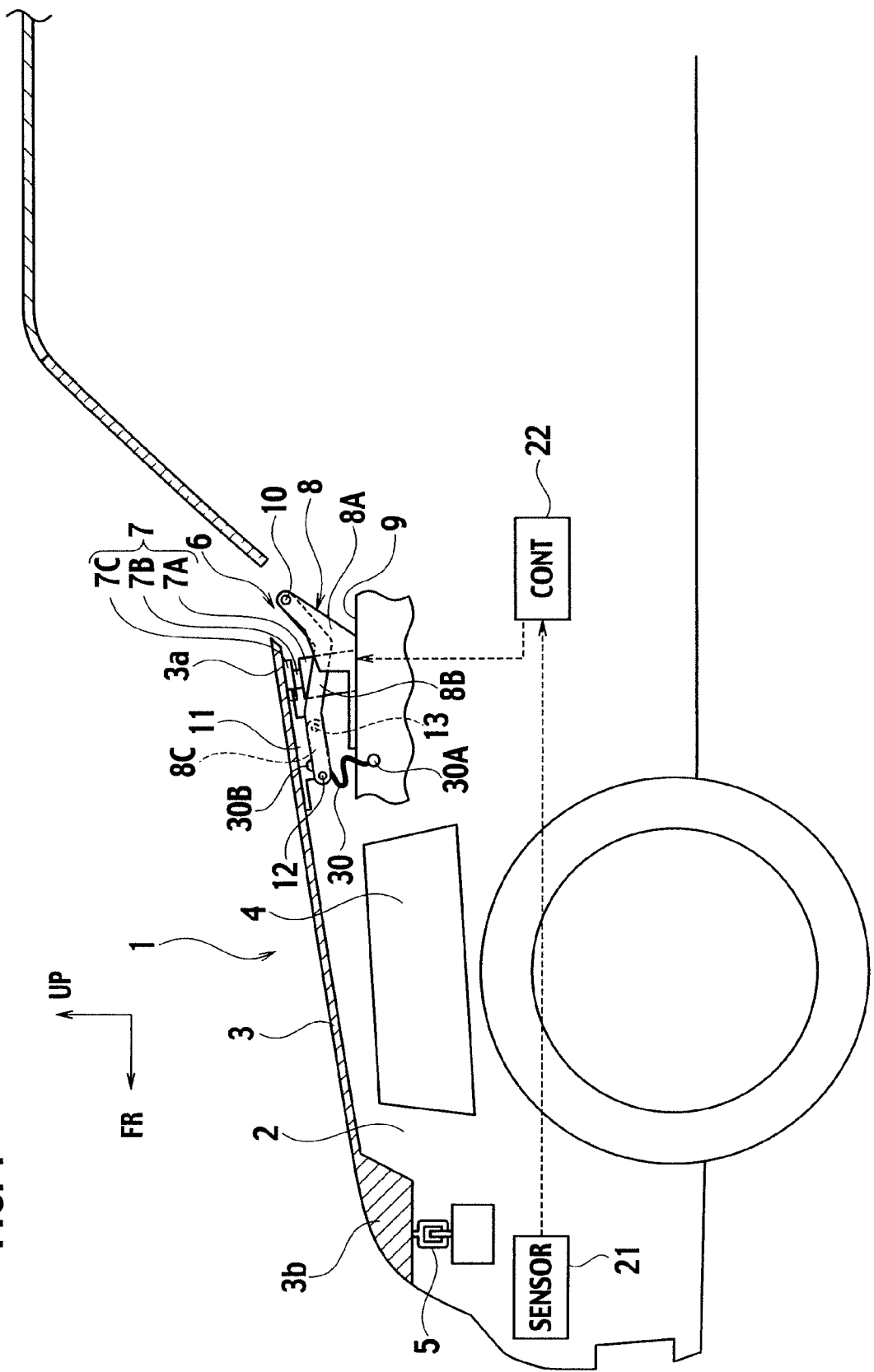
FIG. 1 is a view illustrating a hood pop-up system with the hood being closed.
Figure 2:
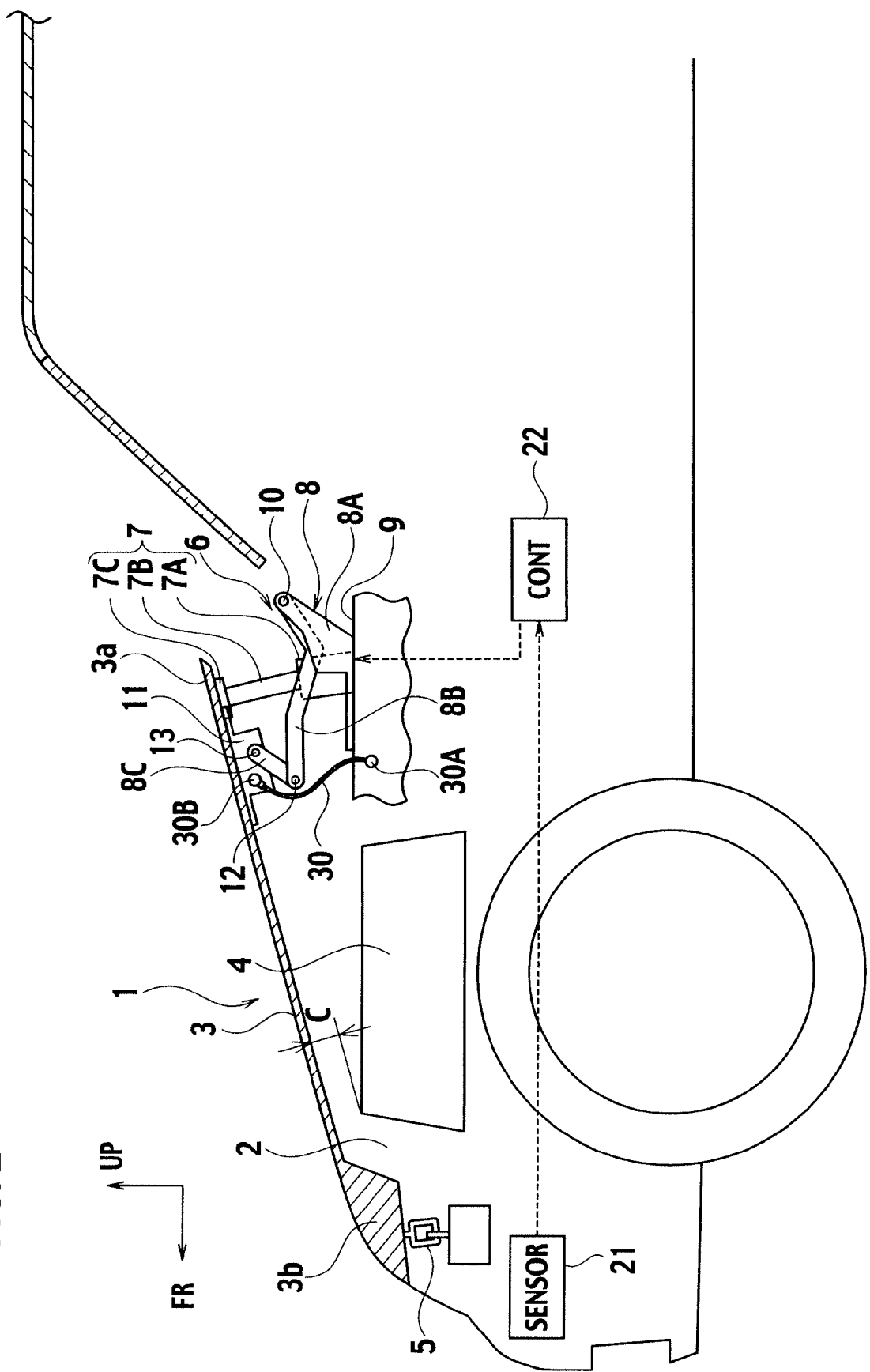
FIG. 2 is a view illustrating the hood pop-up system with the hood popped up to a hood support position.

A preferred embodiment of the present invention will be described in detail with reference to the drawings. FIG. 1 and FIG. 2 show a hood pop-up system for a vehicle according to the preferred embodiment. When the front portion of a vehicle 1 collides with an obstacle, or when the collision is predicted, the hood pop-up system raises (pops up) a rear-end portion 3*a* of a hood 3 provided to cover an engine compartment 2 from above. The popped-up hood 3 leaves a certain clearance (space) between the hood 3 and a structure/equipment 4 installed in the engine compartment 2.

A hood-lock mechanism 5 is provided to lock a front-end portion 3*b* of the hood 3 to the front frame of the vehicle 1. When the food lock mechanism 5 is unlocked, the hood 3 can be opened and closed by moving the front-end portion 3*b* up and down. Leaving the hood 3 at its opening position allows the inspection of the engine compartment 2 and the like.

The rear-end portion 3*a* of the hood 3 is adapted to be popped up upwards by a hood pop-up unit 6. The hood pop-up unit 6 includes: an actuator 7 to pop up the rear-end portion 3*a* of the hood 3; a hood-hinge mechanism assembly 8; and a wire 30, which is a hood pop-up restriction unit provided between the hood 3 and a vehicle body 9.

The actuator 7 includes: a main-body member 7A; a piston member 7B; and a pop-up member 7*c*. The main-body member 7A is fixed to the vehicle body 9. The piston member 7B is movable upwards/downwards relative to the main-body member 7A and is retractable into the main-body member 7A. The pop-up member 7C is provided on the upper-end portion of the piston member 7B and is set in contact with the bottom-side surface of the hood 3. An example of the actuator 7 is an inflator using explosives. A sensor 21 is provided to detect the collision of the front portion of the vehicle with an obstacle and to send the detection signal to a controller 22 that is provided to send an instruction to ignite the inflator. Alternatively, the controller may send an instruction to the inflator when the controller predicts the collision of the front portion of the vehicle with the obstacle on the basis of signals from various sensors. In the actuator 7, the ignition raises the gas pressure of a gas-pressure chamber formed inside the main-body member 7A. The raised pressure in turn raises the piston member 7B so as to stick out of the main-body member 7A. The pop-up member 7C provided on the upper-end portion of the sticking-out piston member 7B raises up the rear-end portion 3*a* of the hood 3.

The hood-hinge mechanism assembly 8 includes: a base member 8A; a first link 8B; and a second link 8C. The base member 8A is fixed to the vehicle body 9. The first link 8B is joined to the rear-end portion of the base member 8A with a pin 10, and extends frontwards from the joint to the rear-end portion of the base member 8A. The first link 8B thus attached is rotatable in the up-and-down direction around the pin 10. The second link 8C has one of its two ends joined to the front-end portion of the first link 8B. A pin 13 is used at the joint, and allows the second link 8C to move rotationally therearound. In addition, a bracket 11 is attached to the bottom-side surface of the hood 3, and the second end of the second link 8C is joined to the bracket 11 with a pin 13, which also allows the second link 8C to move rotationally therearound.

The wire 30 has one of its two ends (referred to as a first end portion 30A) fixed to the vehicle body 9 and the second end (referred to as a second end portion 30B) fixed to the bracket 11. The wire 30 restricts the upward movement of the popped-up hood 3 at a position located above a position where the hood 3 is supported in a state with the oscillation thereof being converged (the position is referred to as a hood-support position S2). To be more specific, when the wire 30 restricts the hood 3, the rear-end portion 3a of the hood 3 is positioned higher than the rear-end portion 3a of the hood 3 positioned at the hood-support position S2 by a certain predetermined amount indicated by H in FIG. 3 (the amount is referred to a pop-up overshooting amount H). To put it differently, the wire 30 limits the maximum height of the popped-up hood 3, and serves as a stopper to prevent the hood 3 from moving upward above a certain predetermined uppermost pop-up position S1 for the popped-up hood 3 (the position is referred to as a maximum opening position S1). When the hood 3 is popped up to the maximum opening position S1 with the wire 30 being pulled to the maximum extent, the rear-end portion 3a of the hood 3 floats above the pop-up member 7C and the hood 3 is not in contact with the pop-up member 7C of the actuator 7.

Next comes the description of a hood pop-up method by use of the hood pop-up system with the above-described configuration.

Suppose a case where the actuator is activated by an instruction from the controller 22. Here, the controller 22 sends the instruction either of the two following cases. Firstly, the controller 22 receives a detection signal sent from the sensor 21 that has detected the collision of the front portion of the vehicle 1 with an obstacle. Secondly, the controller 22 predicts the collision of the front portion of the vehicle 1 with an obstacle based on signals sent from various sensors. As FIG. 2 shows, activating the actuator 7 makes the piston member 7B stick out of the main-body member 7A, and the pop-up member 7C provided on the upper-end portion of the piston member 7B pops up the hood 3. The stroke of the piston member 7B is set so that the piston member 7B can move from a first position where the hood 3 is positioned at the closed position shown in FIG. 1 to a second position where the hood 3 is positioned at the hood-support position S2, not the maximum opening position S1.

Figure 3:
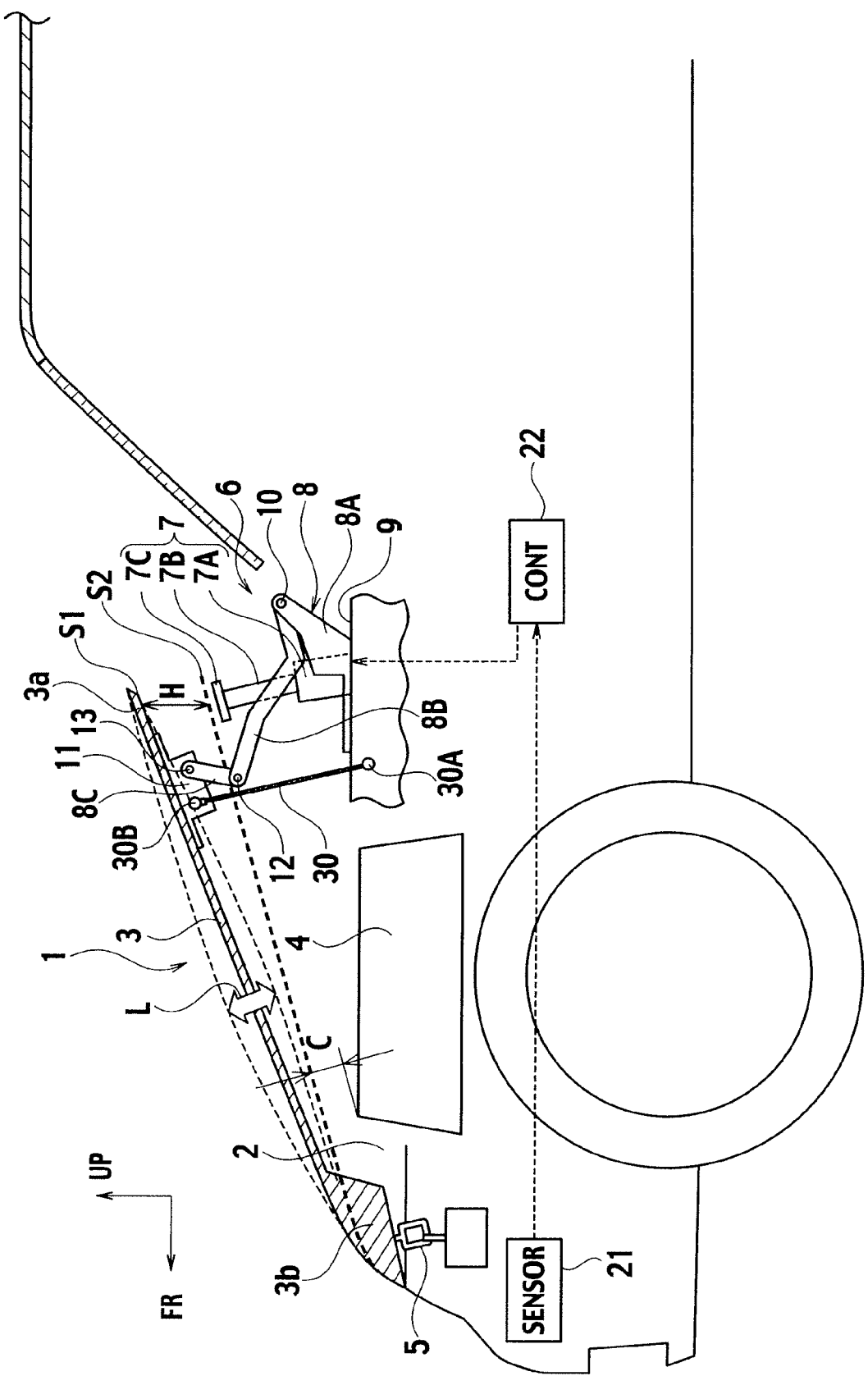
FIG. 3 is a view illustrating the hood pop-up system with the hood temporarily popped up above the hood support position.

Popping up the hood 3 makes the rear-end portion 3a of the hood 3 move upwards, and the upward movement of the hood 3 makes the first link 8B and the second link 8C rotate around the respective pins 10, 12, and 13. At the time when the rear-end portion 3a of the hood 3 reaches the position of a pop-up overshooting amount H, the rear-end portion 3a is pulled downwards by the wire 30. The hood 3 at this moment is located at the maximum opening position S1 (the uppermost pop-up position for the popped-up hood 3) as shown in FIG. 3.

With the hood 3 positioned at the maximum opening position S1, the wire 30 is being pulled to have the longest possible length. The hood 3 is not allowed to move upwards any longer. Due to the inertial force (impact force) acting on the hood 3 when the actuator 7 pops up the hood 3, the hood 3 oscillates in its thickness direction at the maximum opening position S1. FIG. 3 illustrates the oscillation of the hood 3 by two thin broken lines. Since the oscillation of the hood 3 once started is to be converged in a very short period of time, the oscillating hood 3 may not block the view of the driver.

The amplitude of the oscillation of the hood 3 is largest in the middle portion of the hood 3 in the longitudinal direction of the hood 3 (in the front-to-rear direction of the vehicle). L in FIG. 3 denotes the largest amplitude. Incidentally, FIG. 3 illustrates, by a thick broken line, the hood-support position S2. Once the oscillation of the hood 3 has been converged, the hood 3 is positioned at the hood-support position S2, resting on the pop-up member 7C of the actuator 7. The hood 3 is popped up to the maximum opening position S1 so that the middle portion of the hood 3 can oscillate between positions above the bottom-side surface of the hood 3 positioned at the hood-support position S2. To put it differently, as FIG. 3 shows, when the hood 3 is positioned at the maximum opening position S1 and oscillates in the thickness direction, the middle portion of the oscillating hood 3, even when the middle portion is at its lowest position in the oscillation, stays above the bottom-side surface of the hood 3 that is positioned at the hood-support position S2 with its oscillation being converged. The hood 3 positioned at the hood-support position S2 leaves a certain predetermined clearance C between the bottom-side surface of the hood 3 and the structure 4 installed in the engine compartment 3.

Figure 4:
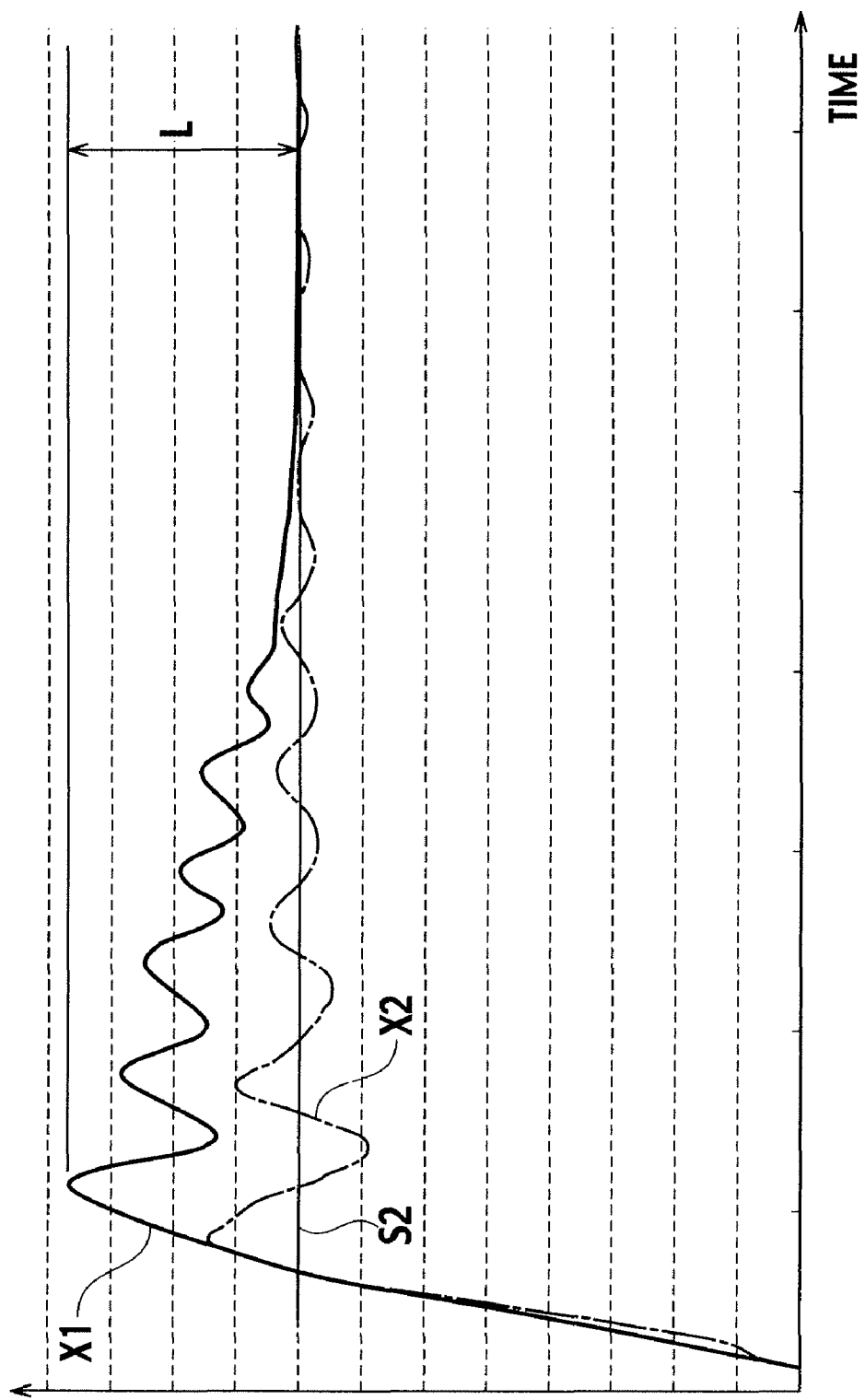
FIG. 4 is a chart illustrating the oscillation of the middle portion of the hood until the convergence thereof.

In FIG. 4, a waveform X1 represents displacement of the oscillation of the middle portion of the hood 3, which is produced by popping-up the hood 3 upwards to the maximum opening position S1. Another waveform X2 represents displacement of the corresponding oscillation produced by popping-up the hood 3 upwards only to the hood-support position S2. Comparing the waveform X1 with the waveform X2 reveals the fact that the middle portion of the oscillating hood 3 of X1 always stays above the position thereof when the hood 3 is at the hood-support position S2.

Once the popped-up hood 3 has reached the maximum opening position S1, the hood 3 is pulled down by its own weight and by the tensile force of the wire 30. As the hood 3 is being pulled down, the oscillation of the hood 3 decreases and is finally converged. The hood 3 eventually reaches the hood-support position S2 and is supported there by the actuator 7.

As described above, the hood 3 in this embodiment is adapted to be popped up to a position located above the hood-support position S2. The maximum opening position S1 (the uppermost pop-up position S1 for the popped-up hood 3) restricted by the wire 30 serving as the hood pop-up restricting unit is higher than the hood-support position S2 where the hood 3 is to be supported by the hood pop-up unit 6. For this reason, the hood 3 oscillates between positions that are located above the hood-support position S2. The clearance C secured in this way between the bottom-side surface of the hood 3 and the structure 4 installed in the engine compartment 2 is wider than the clearance C secured when the hood 3 is designed to oscillate at the hood-support position S2. As a consequence, the clearance C that is wide enough can be secured in this embodiment between the hood 3 and the structure 4 installed in the engine compartment 2.

Now, suppose a case where the hood 3 is popped up while the hood-support position S2 and the maximum opening position S1 are made to be the same position. In this case, the oscillation of the hood 3 reduces the clearance C between the hood 3 and the structure 4 installed in the engine compartment 2. A possible way to compensate for the reduction is to design the clearance C to be larger than otherwise. The larger clearance C, however, makes the actuator 7 larger than otherwise, and possibly harms the view forward from the driver's seat. By contrast, the compact actuator 7 that is employed in this embodiment allows the clearance C to be wide enough to prevent the hood 3 from being brought into contact with the structure 4 installed in the engine compartment 2. In addition, once the oscillation has been converged, the hood 3 descends to the hood-support position S2 leaving a clear view forward from the driver's seat.

In addition, the hood 3 in this embodiment is popped up so that the oscillating middle portion of the hood 3, which marks the maximum amplitude L among all the parts of the popped-up and oscillating hood 3, can always stay at a higher position than the bottom-side surface of the hood 3 positioned at the hood-support position S2. To put it other way, the lowest position of the maximum-amplitude point of the hood 3 that is oscillating at the maximum opening position S1 (the uppermost pop-up position S1 for the popped-up hood 3) is positioned above the bottom-side surface of the hood 3 that is located at the hood-support position S2. For this reason, although the protection performance against an obstacle is designed based on the hood-support position S2 of the hood 3, the hood pop-up system can consistently achieve a high protection performance without worsening the view forward from the driver's seat or making the pop-up unit 6 become larger in size.

In addition, the hood 3 in this embodiment is popped up by the hood pop-up unit 6, then reaches the maximum opening position S1 (the uppermost pop-up position S1 for the popped-up hood 3), and then falls down to reach the hood-support position S2. During all through the process, the hood 3 is kept not in contact with the actuator 7, so that the actuator 7 cannot impose any restriction on the movement of the hood 3. Accordingly, the hood 3 is allowed to oscillate freely without hindrance.

The preferred embodiment described herein is illustrative and not restrictive, and the invention may be practiced or embodied in other ways without departing from the spirit or essential character thereof.

Figure 5:
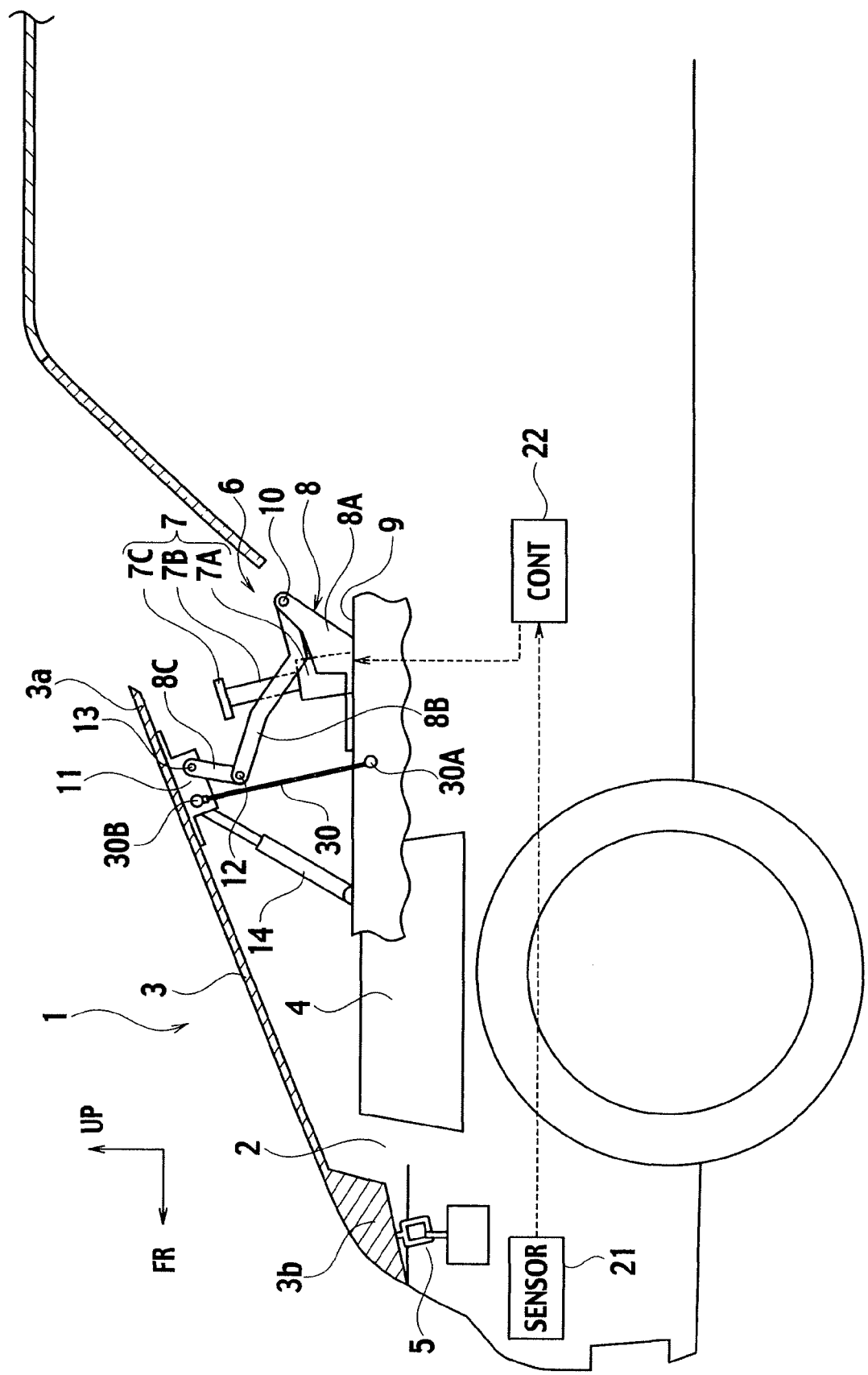
FIG. 5 is a view illustrating a hood pop-up system provided with a damping-force generating apparatus.

For example, a damping-force generator 14 may be additionally provided in the hood pop-up system of the above-described embodiment as shown in FIG. 5. The damping-force generator 14 to be provided here is adapted to control the length of time from the popping-up of the hood 3 by the hood pop-up unit 6 to the arriving of the hood 3 at the hood support position S2. During the period, the popped-up hood 3 reaches the maximum opening position S1 (the uppermost pop-up position for the popped-up hood 3), and then starts to fall downwards until the hood 3 reaches the hood support position S2.

The damping-force generator 14 includes a gas stay. One end of the gas stay is connected to the vehicle body 9 while the other end of the gas stay is connected to the hood 3. The placement of the damping-force generator 14 between the vehicle body 9 and the hood 3 makes it possible to control the length of time between the start of the oscillation of the popped-up hood 3 and the arriving of the falling hood 3 at the hood support position S2. To be more specific, adjusting the damping force of the damping-force generator 14 makes it possible to set up freely the length of time in which the hood 3 is firstly popped-up by the hood pop-up unit 6, then the popped-up hood 3 reaches the maximum opening position S1 (the uppermost pop-up position for the popped-up hood 3), thereafter the hood 3 starts to falling downward, and finally the falling hood 3 reaches the hood support position S2.

In place of the wire 30, a stopper may be provided in the hood-hinge mechanism assembly 8 in the hood pop-up system so as to restrict the rotation of the first and the second links 8B and 8C. This stopper is designed to block the stretching-out action of the hood-hinge mechanism assembly 8, and thereby to restrict the popping-up of the hood 3.

Moreover, providing a mechanism to restrict the popping-up of the hood 3 in the actuator 7 integrated with the hood-hinge mechanism assembly 8 may eliminate the wire 30.

Furthermore, in the above-described embodiment, the present invention is described as a system for popping up the front hood provided in the front portion of the vehicle 1, but the hood pop-up system of the present invention may be used to pop up the rear hood provided in the rear portion of the vehicle 1.

The scope of the invention being indicated by the claims, and all variations which come within the meaning of claims are intended to be embraced herein.

The present disclosure relates to subject matters contained in Japanese Patent Application No. 2007-239638, filed on Sep. 14, 2007, the disclosure of which is expressly incorporated herein by reference in its entirety.

What is claimed is:

1. A hood pop-up system for a vehicle that pops up a hood of the vehicle when a collision of the vehicle takes place, comprising:
    a hood pop-up unit which pops up the hood positioned at a closed position and supports the popped-up hood at a hood support position that is higher than the closed position; and
    a hood pop-up restricting unit which restricts upward movement of the popped-up hood at an uppermost pop-up position that is higher than the hood support position.

2. The hood pop-up system for a vehicle according to claim 1, wherein
    the hood is oscillated at the uppermost pop-up position by being popped up by the hood pop-up unit, and
    the oscillating hood at the uppermost pop-up position is positioned above a bottom-side surface of the hood supported at the hood support position.

3. The hood pop-up system for a vehicle according to claim 1, wherein
    the hood and the hood pop-up unit have no contact with each other throughout the time in which: the hood is firstly popped up by the hood pop-up unit; the hood then reaches the uppermost pop-up position; and, thereafter, the hood falls downwards until the hood reaches the hood support position.

4. The hood pop-up system for a vehicle according to claim 1, further comprising:
    a damping-force generator adapted to control length of the time in which: the hood is firstly popped up by the hood pop-up unit; the hood then reaches the uppermost pop-up position; and, thereafter, the hood falls downwards until the hood reaches the hood support position.

5. A method of popping up a hood for a vehicle, comprising:
    popping up a hood when a collision of the vehicle takes place;
    making the popped-up hood reach an uppermost pop-up position;
    letting the popped-up hood fall downwards; and
    supporting the popped-up hood at a hood support position that is lower than the uppermost pop-up position.

6. A hood pop-up system for a vehicle that pops up a hood of the vehicle when a collision of the vehicle takes place, comprising:
    means for popping up the hood positioned at a closed position and for supporting the popped-up hood at a hood support position that is higher than the closed position; and
    means for restricting upward movement of the popped-up hood at an uppermost pop-up position that is higher than the hood support position.

* * * * *